(12) United States Patent
Hurst et al.

(10) Patent No.: US 8,720,974 B2
(45) Date of Patent: May 13, 2014

(54) SIDEWALL AND METHOD FOR BONDING SIDEWALL PANELS

(75) Inventors: William Hurst, New Holland, PA (US); Gregory Radanovic, Lancaster, PA (US)

(73) Assignee: Morgan Trailer Financial Management, L.P., Houston, TX (US)

( * ) Notice: Subject to any disclaimer, the term of this patent is extended or adjusted under 35 U.S.C. 154(b) by 0 days.

(21) Appl. No.: 13/113,753

(22) Filed: May 23, 2011

(65) Prior Publication Data

US 2011/0285169 A1 Nov. 24, 2011

Related U.S. Application Data

(60) Provisional application No. 61/346,939, filed on May 21, 2010.

(51) Int. Cl.
*B62D 25/02* (2006.01)
*B32B 3/00* (2006.01)
*B29C 65/48* (2006.01)

(52) U.S. Cl.
USPC ............... 296/186.1; 156/278; 428/77

(58) Field of Classification Search
USPC ......... 296/186.1, 186.3, 191, 184.1, 183.1, 296/182.1, 185.1, 29; 220/652, 1.5; 52/461
See application file for complete search history.

(56) References Cited

U.S. PATENT DOCUMENTS

| | | | |
|---|---|---|---|
| 4,940,279 A | 7/1990 | Abott et al. | |
| 4,958,472 A | 9/1990 | Ehrlich | |
| 5,195,800 A * | 3/1993 | Stafford et al. | 296/186.1 |
| 5,285,609 A | 2/1994 | Goad | |
| 5,403,062 A * | 4/1995 | Sjostedt et al. | 296/181.3 |
| 5,472,290 A * | 12/1995 | Hulls | 403/393 |
| 5,938,274 A | 8/1999 | Ehrlich | |
| 5,992,117 A | 11/1999 | Schmidt | |
| 5,997,076 A | 12/1999 | Ehrlich | |
| 6,199,939 B1 * | 3/2001 | Ehrlich | 52/582.1 |
| 6,959,959 B1 * | 11/2005 | Roush | 296/186.1 |
| 7,500,713 B2 * | 3/2009 | Riley et al. | 296/191 |
| 7,621,589 B1 * | 11/2009 | Gerome | 296/186.1 |
| 7,971,926 B2 * | 7/2011 | Lemmons | 296/186.1 |
| 2005/0241253 A1 | 11/2005 | Song et al. | |
| 2009/0235604 A1 | 9/2009 | Cheng et al. | |

* cited by examiner

*Primary Examiner* — Glenn Dayoan
*Assistant Examiner* — Sunsurraye Westbrook
(74) *Attorney, Agent, or Firm* — Osha Liang LLP; John W. Montgomery

(57) ABSTRACT

A method for bonding sidewall panels each comprising first and second skins and a core member sandwiched therebetween. The first skin has a main portion and an overlapping portion extending beyond the core member. The second skin has a main portion and an overlapped portion not extending beyond the core member. The method comprises the following steps. First, an entire exterior surface of the first skin and only an exterior surface of the main portion of the second skin of each of said sidewall panels are painted. Then, the sidewall panels are oriented such that the overlapping portion of the first skin of one sidewall panel is planarly aligned with the overlapping portion of the second skin of another sidewall panel. Next, the overlapping portion of the first skin of one sidewall panel is adhesively bonded to the overlapped portion of the second skin of another sidewall panel.

22 Claims, 6 Drawing Sheets

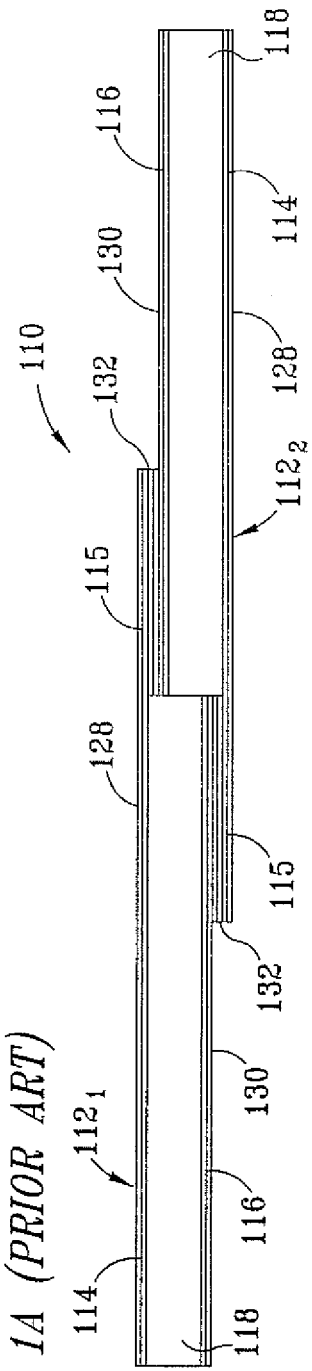
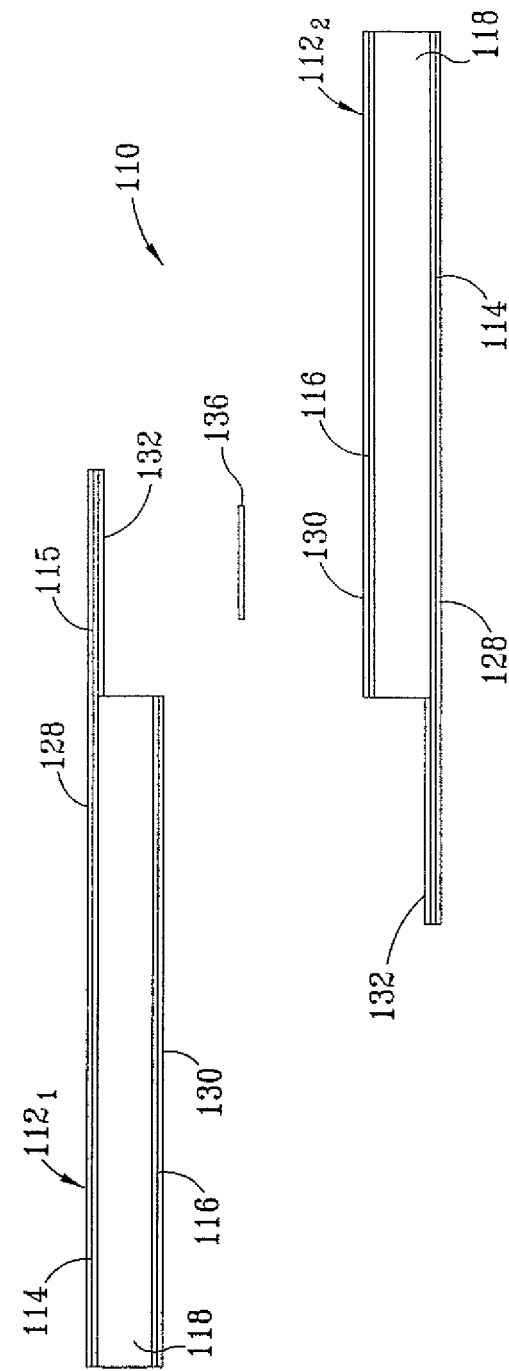
FIG. 1A (PRIOR ART)
FIG. 1B (PRIOR ART)

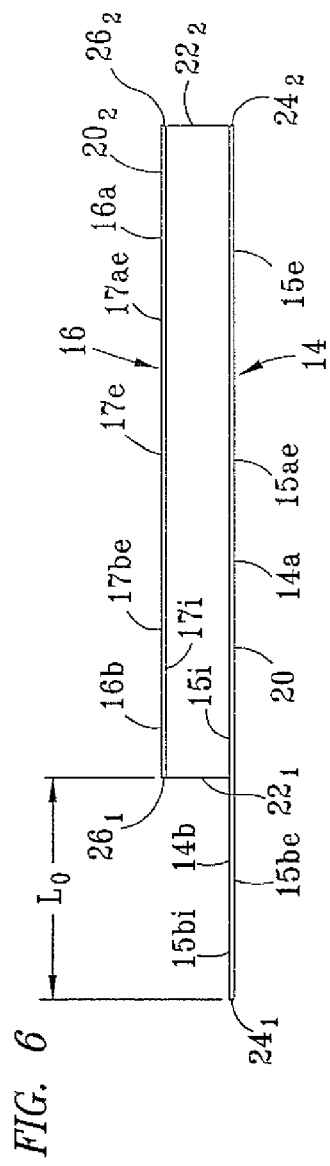
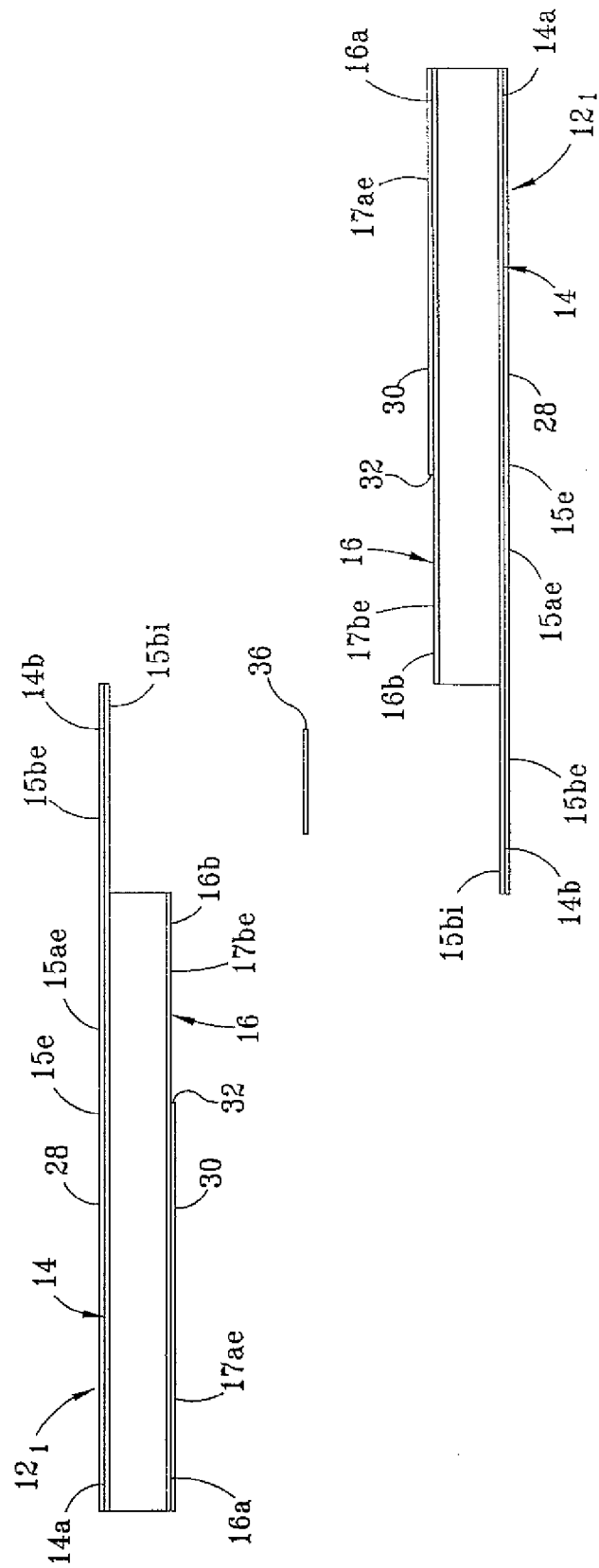
FIG. 6
FIG. 7

US 8,720,974 B2

SIDEWALL AND METHOD FOR BONDING SIDEWALL PANELS

CROSS-REFERENCE TO RELATED APPLICATION

This application claims the benefit under 35 U.S.C. 119(e) of U.S. Provisional Application No. 61/346,939 filed Mar. 21, 2010.

BACKGROUND OF THE INVENTION

1. Field of the Invention

The present invention relates to sidewalk and methods for joining composite sidewall panels and, more particularly, to a sidewall and method for joining composite sidewall panels of a cargo container by adhesive bonding.

2. Description of the Related Art

The bonding of pre-painted, substantially identical sidewall panels $112_1$ and $112_2$, especially of a sidewall (or a front wall, or a door) 110 of a cargo container, such as van-style cargo truck body, trailer or the like, involves adhesive bonding the pre-painted sidewall panels $112_1$ and $112_2$. Specifically, each of the sidewall panels $112_1$ and $112_2$ comprises a first skin 114, a second skin 116 and a core board member 118 sandwiched between the first and second skins 114, 116. The first skin 114 of each of the sidewall panels $112_1$ and $112_2$ includes an overlapping portion 115 extending laterally away from an edge of the core board member 118. Exterior surfaces of the first and second skins 114, 116 of each of the sidewall panels $112_1$ and $112_2$, including both surfaces of the overlapping portion 115 of the first skin 114, are pre-painted, i.e., covered with paint coatings 128, 130 and 132, as shown in FIGS. 1A and 1B.

The adhesive bonding of the sidewall panels $112_1$ and $112_2$ is done with metal bonding type of adhesive 136 that adhesive bonds the overlapping portion 115 of the first skin 114 of the sidewall panel $112_1$ to the second skin 116 of the sidewall panels $112_2$. The strength of this adhesive bond is determined by the strength of the adhesive 136 and by the strength of the bond to the pre-painted surface that the adhesive 136 is applied to. The painted surfaces of the first and second skins 114, 116 of the sidewall panels $112_1$ and $112_2$ have a surface energy value that can vary when different paint colors are requested and/or when the type of paint coating changes. Because of this difference in surface energy created between colors or paint coatings, the strength and the mode of failure performance of the adhesive bond (joint) are affected.

Thus, conventional methods for adhesive bonding composite sidewall panels are susceptible to improvements.

SUMMARY OF THE INVENTION

A first aspect of the invention provides a method for bonding sidewall panels. Each of the sidewall panels comprises a first skin, a second skin and a core member sandwiched between the first skin and the second skin. The first skin has a main portion and an overlapping portion extending beyond the core member. The second skin has a main portion and an overlapped portion not extending beyond the core member. The method comprises the following steps. First, at least two of the sidewall panels are provided. Next, an entire exterior surface of the first skin and only an exterior surface of the main portion of the second skin of each of said sidewall panels are painted such that an interior surface of the overlapping portion of the first skin and an exterior surface of the overlapping portion of the second skin of each of the sidewall panels is unpainted. Then, the sidewall panels are oriented parallel relative to each other such that the overlapping portion of the first skin of one of the sidewall panels is planarly aligned with the overlapping portion of the second skin of another of the sidewall panels. Next, the overlapping portion of the first skin of one of the sidewall panels is adhesively bonded to the overlapped portion of the second skin of another of the sidewall panels.

According to a second aspect of the invention, a sidewall of a cargo container is provided that includes at least two sidewall panels. Each of the at least two sidewall panels comprises a first skin, a second skin and a core member sandwiched between the first skin and the second skin. The first skin has a main portion and an overlapping portion extending beyond the core member. The second skin has a main portion and an overlapped portion not extending beyond the core member. An entire exterior surface of the first metal skin and only an exterior surface of the main portion of the second metal skin of each of the sidewall panels is painted such that an interior surface of the overlapping portion of the first skin and an exterior surface of the overlapping portion of the second metal skin of each of the sidewall panels is unpainted. The overlapping portion of the first skin of one of the at least two sidewall panels is planarity aligned with and adhesively bonded to the overlapped portion of the second skin of another of the at least two sidewall panels.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, wherein:

FIG. 1 is a partial cross-sectional view of a conventional sidewall of a cargo container;

FIG. 1B is a partial exploded cross-sectional view of the conventional sidewall including pre-painted composite sidewall panels joined by adhesive bonding;

FIG. 6 is a cross-sectional view of the unpainted composite sidewall panel according to the exemplary embodiment of the present invention; and FIG. 7 is a partial exploded cross-sectional view of the sidewall of a cargo container including pre-painted composite sidewall panels joined by adhesive bonding according to the exemplary embodiment of the present invention.

DESCRIPTION OF EXEMPLARY EMBODIMENTS

Figure 2:
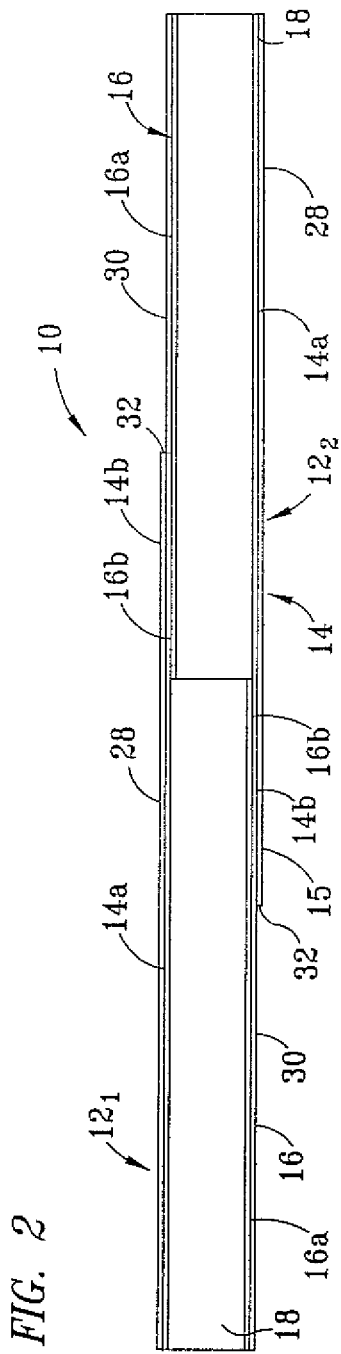
FIG. 2 is a partial cross-sectional view of a sidewall of a cargo container, which incorporates the features of an exemplary embodiment of the present invention.
Figure 3:
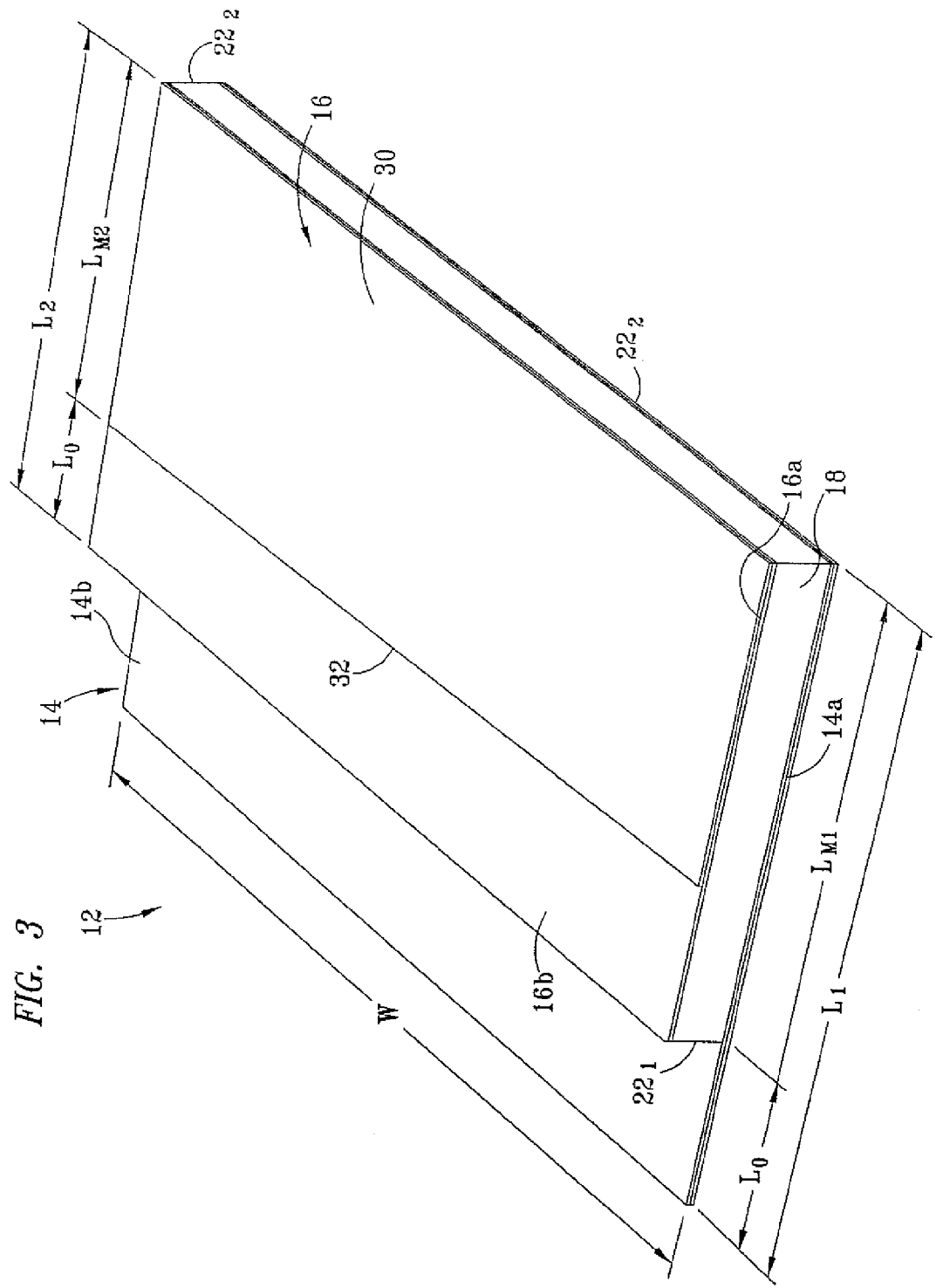
FIG. 3 is a perspective view of a composite sidewall panel according to the exemplary embodiment of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" as used in the claims means "at least one" and the word "two" as used in the claims means "at least two".

FIG. 2 schematically depict a sidewall (or a front wall, or a door) 10 of a cargo container, such as van-style cargo truck body, trailer or the like. The sidewall 10 is formed by at least two laminated, composite sidewall panels: a first composite sidewall panel $12_1$ and a second composite sidewall panel $12_2$, which are joined together by adhesive bonding as described herein. According to the exemplary embodiment of the present invention, the first and second composite sidewall panels $12_1$ and $12_2$ are substantially structurally and geometrically identical. In view of the structural similarities of the first and second composite sidewall panels $12_1$ and $12_2$ and in the interest of simplicity, the following discussion will sometimes use a reference numeral without a subscript number to designate both of the composite sidewall panels. For example, the reference numeral 12 will be used when generically referring to the composite sidewall panels $12_1$ and $12_2$ rather than reciting both reference numerals. The size of the panels depends on the particular application.

As illustrated in detail in FIGS. 3-6, the sidewall panel 12 comprises a first metal skin 14 and a second metal skin 16 which are bonded by a thin adhesive layer to a core board member 18, which is sandwiched therebetween. According to the exemplary embodiment of the present invention, both the first metal skin 14 and the second metal skin 16 are in the form of rectangular, flat metal plates (or sheets) oriented opposite and parallel to each other. The first metal skin 14 of the sidewall panel 12 has first and second opposite, parallel edges (or ends) $24_1$ and $24_2$, respectively, while the second metal skin 16 of the sidewall panel 12 has first and second opposite, parallel edges (or ends) $26_1$ and $26_2$, respectively. Moreover, the opposite edges $24_1$ and $24_2$ of the first metal skin 14 are substantially parallel to the opposite edges $26_1$ and $26_2$ of the second metal skin 16. According to the exemplary embodiment of the present invention, the first and second metal skins 14 and 16, respectively, are made of a steel sheet, preferably, with an extra smooth galvanized coating.

The core member (or core board member) 18 is made, for example, of plastic material. The core member 18 is in the form of a rectangular cuboid (or board) and has first and second opposite, planar, parallel, rectangular surfaces $20_1$ and $20_2$, respectively, shown in FIG. 6. The first metal skin 14 is attached, such as by adhesively bonding, to the first surface $20_1$ of the core board member 18, white the second metal skin 16 is attached to the second surface $20_2$ of the core board member 18 so that the opposite edges $24_1$ and $24_2$ of the first metal skin 14 are substantially parallel to the opposite edges $26_1$ and $26_2$ of the second metal skin 16. According to the exemplary embodiment of the present invention, the first and second metal skins 14 and 16 are bonded to the core board member 18 by a thin adhesive layer so as to sandwich the core board member 18 therebetween. The core board member 18 of the sidewall panel 12 has first and second opposite, parallel edges (or ends) $22_1$ and $22_2$, respectively, that are substantially parallel to the opposite edges $24_1$ and $24_2$ of the first metal skin 14 and to the opposite edges $26_1$ and $26_2$ of the second metal skin 16.

As noted above, the first metal skin 14 of the composite sidewall panel 12 is in the form of rectangular, flat metal plate (or sheet) having a length $L_1$ and a width W, while the second metal skin 16 thereof is also in the form of rectangular, flat metal plate (or sheet) having a length $L_2$ and a width W, the same as the width of the first metal skin 14. As illustrated, the length $L_1$ of the first metal skin 14 is substantially bigger than the length $L_2$ of the second metal skin 16. The rectangular cuboid core board member 18 has a length equal to the length $L_2$ of the second metal skin 16 and a width equal to the width of both the first and second metal skins 14 and 16. It should be understood that the sidewall panel 12 may be of any appropriate dimension depending only on constrictions required for the cargo container and its use. Furthermore, each of the first metal skin 14 and the second metal skin 16 of the sidewall panel 12 has an inner surface 15$i$ and 17$i$, respectively, both facing the core board member 18, and an exterior surface 15$e$ and 17$e$, respectively, both facing away from the core board member 18.

As illustrated in detail in FIGS. 3-6, the first metal skin 14 has a main portion 14$a$ entirely attached to the first surfaces $20_1$ of the core member 18, and an overlapping portion 14$b$ extending laterally from the main segment 14$a$ away from (beyond) the first edge $22_1$ of the core board member 18 a predetermined overlapping distance $L_O$. In other words, the main portion 14$a$ of the first metal skin 14 is separated from the overlapping portion 14$b$ thereof by the first edge $22_1$ of the core board member 18. Moreover, the main portion 14$a$ of the first metal skin 14 has a length $L_{M1}$ and the width W, while the overlapping portion 14$b$ thereof has a length $L_O$ and the width W. In other words, the main portion 14$a$ of the first metal skin 14 has the same length and width as the second metal skin 16 and the core board member 18 (i.e., $L_{M1}=L_2$). Moreover, the main portion 14$a$ of the first metal skin 14 is defined by an exterior surface 15$ae$ facing away from the core board member 18, while the overlapping portion 14$b$ thereof is defined by an inner surface 15$bi$, which is a part of the inner surface 15$i$ of the first metal skin 14 extending laterally beyond the first edge $22_1$ of the core board member 18, and an exterior surface 15$ae$, which is a part of the exterior surface 15$e$ of the first metal skin 14 extending laterally beyond the first edge $22_1$ of the core board member 18. Together, the exterior surfaces 15$ae$ and 15$be$ of the main portion 14$a$ and the overlapping portion 14$b$ form the exterior surface 15$e$ of the first metal skin 14. In the exemplary embodiment of the present invention, the overlapping portion 14$b$ is integrally formed as part of the main portion 14$a$ of the first metal skin 14 of the composite sidewall panel 12. In other words, the first metal skin 14 is formed as a single-piece part.

Figure 4:
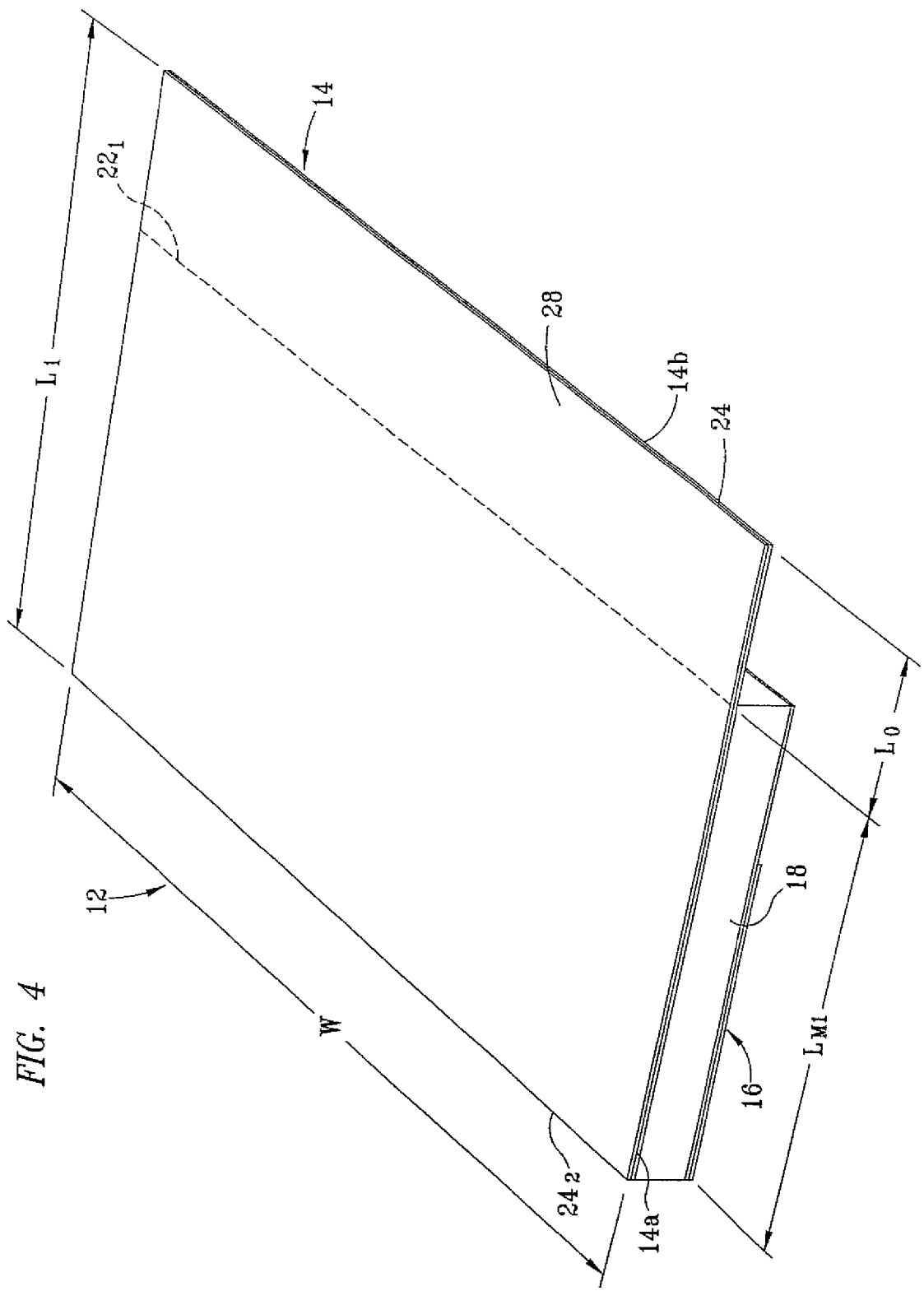
FIG. 4 is another perspective view of the composite sidewall panel of FIG. 3.
Figure 5:
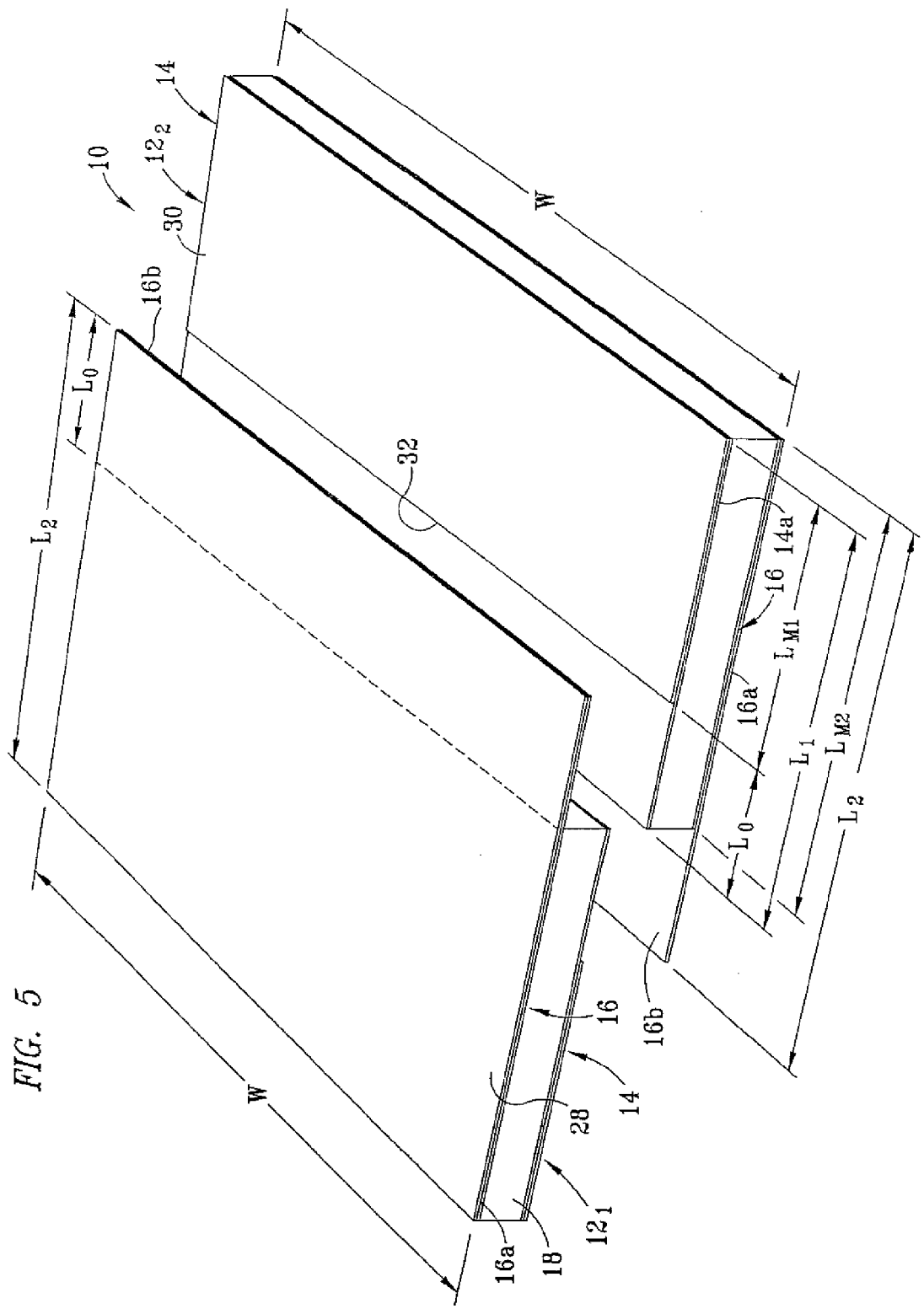
FIG. 5 is a partial exploded perspective view of a sidewall of a cargo container including composite sidewall panels joined by adhesive bonding according to the exemplary embodiment of the present invention.

As further illustrated in FIGS. 4-6, the second metal skin 16 is entirely attached to the second surfaces $20_2$ of the core board member 18. Moreover, the second metal skin 16 includes a main portion 16a and an overlapped portion 16b juxtaposed to the main portion 16a. As illustrated, the second metal skin 16 does not extend beyond the edges of the core board member 18. The main portion 16a of the second metal skin 16 has a length $L_{M2}$ and the width W, while the overlapped portion 16b thereof has a length $L_O$ and the width W. In the exemplary embodiment, the overlapped portion 16b of the second metal skin 16 is geometrically substantially identical to the overlapping portion 14b of the first metal skin 14, i.e., is substantially the same in length and width. In other words, an area of the overlapped portion 16b of the second skin 16 is equal to an area of the overlapping portion 14b of the first skin 14. The overlapped portion 16b of the second metal skin 16 of one of the panel 12 (e.g., the first composite sidewall panel $12_1$) is provided for overlapping and engaging the overlapping portion 14b of the first metal skin 14 of another panel 12 (e.g., the second composite sidewall panel $12_2$) as described herein, as shown in FIGS. 2, 5 and 7.

Moreover, the main portion 16a of the second metal skin 16 is defined by an exterior surface 17ae facing away from the core board member 18, while the overlapping portion 16b thereof is defined by an exterior surface 17be also facing away from the core board member 18. Together, the exterior surfaces 17ae and 17be of the main portion 16a and the overlapping portion 16b form the exterior surface 17n of the second metal skin 16.

A method for joining the composite sidewall panels $12_1$ and $12_2$ according to the exemplary embodiment of the present invention is as follows.

First, the substantially identical first and second composite sidewall panels $12_1$ and $12_2$ as described above are provided. The first and second metal skins 14 and 16 are made of a steel sheet with the extra smooth galvanized coating on the steel sheet in the exemplary embodiment of the present invention. Alternatively, the first and second metal skins 14 and 16 can be made of a bare (non-galvanized or coated) steel sheet.

Next, an entire exterior surface 15e (i.e., the exterior surfaces 15ae and 15be of both the main portion 14a and the overlapping portion 14b) of the first metal skin 14 of each of the first and second composite sidewall panels $12_1$ and $12_2$ is painted (or paint coated, or coated with a layer of paint) with a first paint coating 28, and only the exterior surface 17ae of the main portion 16a the second metal skin 16 is painted with a second paint coating 30, while leaving the inner surface 15bi of the overlapping portion 14b of the first metal skin 14 and the exterior surface 17be of the overlapping portion 16b of the second metal skin 116 unpainted. In other words, the second metal skin 16 is painted by indexing the paint coating in from a separating edge (or line) 32 (shown in FIGS. 3, 5 and 7) separating the main portion 14a and the overlapping portion 14b of the first metal skin 14, thus exposing the bare metal, primer or galvanized steel material of the second metal skin 16. The separating edge 32 is substantially parallel to the opposite edges $24_1$ and $24_2$ of the first metal skin 14, to the opposite edges $26_1$ and $26_2$ of the second metal skin 16, and to the first and second opposite edges $22_1$ and $22_2$ of the core board member 18.

Alternatively, prior to painting, the exterior surfaces 15e and 17e of the first and second metal skins 14 and 16 and the inner surface 15bi of the overlapping portion 14b of the first metal skin 14 can be coated with an appropriate epoxy primer. In other words, the inner surface 15bi of the overlapping portion 14b of the first metal skin 14 and the exterior surface 17be of the overlapping portion 16b of the second metal skin 16 could be coated with an appropriate primer (prior to painting) or be in the form of unpainted galvanized steel.

For the purpose of this invention, the term "paint" means a substance composed of solid coloring matter (such as solid pigment(s)) suspended in a liquid medium applied as a protective or decorative coating to various surfaces, or a process of coating or covering a substrate with a thin layer with paint. The metal skin 14, 16 with galvanized steel coating or primer coating is not considered to be painted.

After the step of painting, the adjacent pre-painted composite sidewall panels $12_1$ and $12_2$ are oriented parallel relative to each other such that the overlapping portion 14b of the first skin 14 of one of the adjacent sidewall panels (for example, the first sidewall panel $12_1$) is planarly aligned with the overlapping portion 16h of the second skin 16 of another of the adjacent sidewall panels (for example, the second sidewall panel $12_1$), as illustrated in FIGS. 5 and 7. It should be understood, that the adjacent composite sidewall panels $12_1$ and $12_2$ are oriented parallel relative to each other when the first and second metal skins 14 and 16 of the first sidewall panel $12_1$ are parallel to the first and second metal skins 14 and 16 of the second sidewall panel $12_2$. More specifically, the overlapping portion 14b of the first skin 14 of the first composite sidewall panel $12_1$ is aligned with the overlapped portion 16b of the second skin 16 of the second composite sidewall panel $12_2$ such that the unpainted interior surface 15bi of the overlapping portion 14b of the first skin 14 of the first composite sidewall panel $12_1$ faces the unpainted exterior surface 17be of the overlapped portion 16b of the second metal skin 16 of the second composite sidewall panel $12_2$.

Then, the composite sidewall panels $12_1$ and $12_2$ are joined together by adhesive bonding using a layer 36 of an appropriate metal bonding type adhesive (adhesive material) provided between the unpainted surfaces 15bi and 17be of the overlapping portion 14b of the first metal skin 14 of the first sidewall panel $12_1$ and the overlapped skin portion 16b of the second metal skin 16 of the second sidewall panel $12_2$, as illustrated in FIG. 7. This provides a consistent bonding of material surfaces between the metal skins and/or sidewall panels regardless of the type of paint or color thereof without impacting the strength or type of allure of the bond between metal skins and/or sidewall panels.

Moreover, in addition to adhesively bonding the overlapping portion 14b of the first metal skin 14 of the first sidewall panel $12_1$ and the overlapped skin portion 16b of the second metal skin 16 of the second sidewall panel $12_2$, the overlapping portion 14b the first metal skin 14 of the second sidewall panel $12_2$ and the overlapped skin portion 16b of the second metal skin 16 of the first sidewall panel 1 may be adhesively bonded.

Therefore, the present invention provides a novel sidewall of a cargo container and a method for adhesive bonding of pre-painted sidewall panels eliminating the effect of color or type of paint may have on the structural integrity and consistency of the adhesive bonded joint. In other words, according to the sidewall and the method of the present invention, the materials bonded together will be the same and consistent regardless of the exterior color or exterior coating.

The foregoing description of the exemplary embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for bonding sidewall panels each comprising a first skin, a second skin and a core member sandwiched between said first skin and said second skin; said first skin having a main portion having an exterior surface and an overlapping portion having an exterior surface and an interior surface opposite said exterior surface and extending beyond said core member; said second skin having a main portion having an exterior surface and an overlapped portion having an exterior surface and not extending beyond said core member; said method comprising the steps of:

painting the entire exterior surface of said first skin and only the exterior surface of said main portion of said second skin of at least two of said sidewall panels such that the interior surface of said overlapping portion of said first skin and the exterior surface of said overlapping portion of said second skin of each of said two sidewall panels being unpainted;

after the painting of the entire exterior surface of the first skin and only the exterior surface of said main portion of said second skin of each of said at least two sidewall panels, orienting said at least two sidewall panels parallel relative to each other such that said overlapping portion of said first skin of one of said sidewall panels being planarly aligned with said overlapping portion of said second skin of another of said at least two sidewall panels; and after the painting of the entire exterior surface of the first skin and only the exterior surface of said main portion of said second skin of each of said at least two sidewall panels, adhesively bonding said overlapping portion of said first skin of one of said at least two sidewall panels to said overlapped portion of said second skin of another of said at least two sidewall panels.

2. The method as defined in claim 1, wherein the step of adhesively bonding said at least two sidewall panels further includes the step of adhesively bonding the exterior surface of said overlapped portion of said second skin of one of said at least two sidewall panels to the interior surface of said overlapping portion of said first skin of another of said at least two sidewall panels.

3. The method as defined in claim 1, wherein the step of orienting said sidewall panels parallel relative to each other includes the step of aligning said overlapping portion of said first skin of one of said sidewall panels with said overlapped portion of said second skin of another of said sidewall panels such that said unpainted interior surface of said overlapping portion of said first skin of one of said sidewall panels faces said unpainted exterior surface of said overlapped portion of said second skin of another of said sidewall panels.

4. The method as defined in claim 1, comprising the step of forming said at least two sidewall panels prior to panting so that they are substantially identical.

5. The method as defined in claim 1, wherein the step of forming said at least two sidewall panels comprises forming said first skin and said second skin in the form of rectangular, flat metal sheets oriented opposite and parallel to each other, and forming said core member in the form of a rectangular cuboid.

6. The method as defined in claim 5, wherein forming said first skin comprises forming said main portion of said first skin with a predetermined length and width and forming said core member thereof having the same predetermined length and width as said main portion of said first skin; wherein forming said second skin comprises forming said main portion of said second skin having a predetermined length and width and forming said core member thereof having the same length and width as said main portion of said second skin; and comprises forming said overlapped portion of said first skin and forming said overlapped portion of said second skin each with the same length and width.

7. The method as defined in claim 1, comprises forming said first skin and said second skin made of steel sheets.

8. The method as defined in claim 1, comprises forming said first skin and said second skin are made of steel sheets with galvanized coating.

9. The method as defined in claim 1, further including the step of coating exterior surfaces of said first and second skins and an inner surface of said overlapping portion of said first skin with a primer prior to said step of painting.

10. The method as defined in claim 1, comprising forming said main portion of said first skin of said first sidewall panel as and said core member thereof having the same area; wherein forming said second skin of said first sidewall panel and said core board member thereof having the same area; and forming said overlapped portion of said second of and said overlapping portion of said first skin having the same area.

11. A sidewall of a cargo container, said sidewall comprising at least first and second sidewall panels;

each of said at least first and second sidewall panels comprising a first skin, a second skin and a core member sandwiched between said first skin and said second skin;

said first skin having a main portion having an exterior surface and an overlapping portion with the exterior surface substantially parallel to the main portion and extending beyond said core member;

said second skin having a main portion having an exterior surface and an overlapped portion with the exterior surface substantially parallel to the main portion and not extending beyond said core member;

the entire exterior surface of said first skin and only the exterior surface of said main portion of said second skin of each of said at least first and second sidewall panels being painted such that an interior surface of said overlapping portion of said first skin and an exterior surface of said overlapping portion of said second skin of each of said at least first and second sidewall panels being unpainted;

said interior surface of said overlapping portion of said first skin of said first sidewall panel being planarly aligned with and adhesively bonded to said exterior surface of said overlapped portion of said second skin of said second sidewall panel.

12. The sidewall as defined in claim 11, wherein said interior surface of said overlapped portion of said second skin of said second sidewall panel is adhesively bonded to said exterior surface of said overlapping portion of said first skin of said first of said sidewall panel.

13. The sidewall as defined in claim 11, wherein an area of said overlapped portion of said second skin is equal to an area of said overlapping portion of said first skin.

14. The sidewall as defined in claim 13, wherein said main portion of said first skin having the same area as said core member thereof; and wherein said second skin having the same area as said core member thereof.

15. The sidewall as defined in claim 11, wherein said sidewall panels are parallel relative to each other and said overlapping portion of said first skin of the first of said sidewall panels is aligned with said overlapped portion of said second skin of the second of said sidewall panels such that said unpainted interior surface of said overlapping portion of said first skin of the first of said sidewall panels faces said unpainted exterior surface of said overlapped portion of said second skin of the second of said sidewall panels.

16. The sidewall as defined in claim 11, wherein said at least first and second sidewall panels are substantially identical.

17. The sidewall as defined in claim 1, wherein said first skin and said second skin are in the form of rectangular, flat metal sheets oriented opposite and parallel to each other, and wherein said core member is in the form of a rectangular cuboid.

18. The sidewall as defined in claim 17, wherein said main portion of said first skin has the same length and width as said core member thereof; wherein said second skin has the same length and width as said core member thereof; and wherein said overlapped portion of said second skin has the same length and width as said overlapping portion of said first skin.

19. The sidewall as defined in claim 11, wherein said first skin and said second skin are made of steel sheets.

20. The sidewall as defined in claim 11, wherein said first skin and said second skin are made of steel sheets with galvanized coating.

21. The method as defined in claim 1, wherein prior to painting said exterior surface of said first skin and an exterior surface of said main portion of said second skin of each of said sidewall panels, coating the exterior surfaces of said first and second skins and the interior surface of said overlapping portion of said first skin with a primer.

22. The method as defined in claim 11, wherein said main portion of said first skin of said first sidewall panel has the same area as said core member thereof; wherein said second skin of said first sidewall panel has the same area as said core board member thereof; and wherein an area of said overlapped portion of said second skin is equal to an area of said overlapping portion of said first skin.

* * * * *